(12) United States Patent
Cao et al.

(10) Patent No.: US 11,965,053 B2
(45) Date of Patent: Apr. 23, 2024

(54) HALOGEN RECOVERY WITH K+-CONTAINING OXIDANT IN A PROCESS FOR HALOGENATING UNSATURATED ISOOLEFIN COPOLYMER

(71) Applicant: ARLANXEO SINGAPORE PTE. LTD., Singapore (SG)

(72) Inventors: Kai Cao, London (CA); Gregory J. E. Davidson, London (CA)

(73) Assignee: ARLANXEO SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 18/265,885

(22) PCT Filed: Dec. 10, 2021

(86) PCT No.: PCT/CA2021/051777
§ 371 (c)(1),
(2) Date: Jun. 7, 2023

(87) PCT Pub. No.: WO2022/120489
PCT Pub. Date: Jun. 16, 2022

(65) Prior Publication Data
US 2023/0391899 A1    Dec. 7, 2023

(30) Foreign Application Priority Data
Dec. 11, 2020    (EP) .................... 20213531

(51) Int. Cl.
*C08F 8/22*    (2006.01)
*C08F 4/46*    (2006.01)
*C08F 210/12*    (2006.01)

(52) U.S. Cl.
CPC ............ *C08F 8/22* (2013.01); *C08F 4/465* (2013.01); *C08F 210/12* (2013.01)

(58) Field of Classification Search
CPC ... C08F 8/20; C08F 8/22; C08C 19/12; C08C 19/14; C08C 19/16; C08C 19/18
See application file for complete search history.

(56) References Cited

U.S. PATENT DOCUMENTS

| | | | | |
|---|---|---|---|---|
| 3,018,275 A | * | 1/1962 | Cottle .................. | C08F 8/20 |
| | | | | 525/356 |
| 5,670,582 A | * | 9/1997 | Chung .................. | C08F 8/22 |
| | | | | 525/356 |
| 5,681,901 A | | 10/1997 | Newman | |
| 5,886,106 A | | 3/1999 | Sumner et al. | |
| 2013/0131281 A1 | * | 5/2013 | Gronowski ........... | C08F 8/22 |
| | | | | 525/356 |
| 2014/0309362 A1 | * | 10/2014 | Leiberich ............. | C09J 115/02 |
| | | | | 524/574 |

FOREIGN PATENT DOCUMENTS

| | | |
|---|---|---|
| CA | 1332997 C | 11/1994 |
| CA | 2161074 A1 | 4/1996 |
| WO | 2013/011017 A1 | 1/2013 |
| WO | 2020/124222 A | 6/2020 |
| WO | 2020/124223 A1 | 6/2020 |
| WO | 2020/132742 A1 | 7/2020 |

OTHER PUBLICATIONS

International Search Report and Written Opinion, PCT Application No. PCT/CA2021/051777 dated Dec. 10, 2021.
Maurice Morton, Rubber Technology, 3$^{rd}$ Edition; Van Nostrand Reinhold Company, (1987) pp. 297-300.

* cited by examiner

*Primary Examiner* — Robert C Boyle
(74) *Attorney, Agent, or Firm* — The Dobrusin Law Firm, P.C.

(57) ABSTRACT

A process for producing a halogenated isoolefin copolymer involves contacting an unsaturated isoolefin copolymer cement, the cement comprising an unsaturated isoolefin copolymer dissolved in an organic solvent, under halogenation conditions with a halogenating agent and an aqueous solution of a potassium salt-based oxidant to form a two-phase reaction medium comprising an organic phase and an aqueous phase, the oxidant capable of converting hydrogen halide to free halogen. The process provides improved halogen recovery, is less sensitive to the presence of water, and makes use of more stable and less environmentally damaging oxidants.

20 Claims, 7 Drawing Sheets

HALOGEN RECOVERY WITH K+-CONTAINING OXIDANT IN A PROCESS FOR HALOGENATING UNSATURATED ISOOLEFIN COPOLYMER

FIELD

This application relates to a process for halogenating an unsaturated isoolefin copolymer.

BACKGROUND

In the standard process for brominating butyl rubber to form bromobutyl rubber, molecular bromine ($Br_2$) is used as the brominating agent. The process results in the evolution of hydrogen bromide (HBr), as a by-product which, under normal conditions, does not further brominate the butyl rubber polymer. Therefore, the theoretical maximum fraction of bromine present in the reaction mixture which can be introduced into the butyl rubber polymer is 50%. However, in practice the fraction is usually less than 45%, and is less than 35% in both laboratory and production plant settings.

Known methods (WO 2020/124222, U.S. 2014/0309362, U.S. Pat. Nos. 3,018,275, 5,681,901) to enhance bromine utilization during butyl rubber bromination involve the application of at least 0.5 mol per mol of brominating agent of a water-soluble oxidizing agent, such as organic peracid or hydrogen peroxide, which re-oxidizes the hydrogen bromide back to elemental bromine. The oxidizing agent can be an aqueous solution, or an aqueous emulsion in an organic solvent. Since the oxidizing agent is only soluble in water, the rate of reaction is governed by the rate in which the reactants can exchange between the organic and aqueous phases, thus requiring a longer reaction time.

Further, the methods utilizing hydrogen peroxide require very low concentrations of water to be present in the bromination medium. The benefits observed from the use of hydrogen peroxide in the bromination medium decrease dramatically with water concentrations greater than 1 wt %, presenting significant challenges and cost industrially, because additional equipment and energy may be needed to reduce the water content in the bromination medium from 10-20 wt % down to below 1 wt %.

In addition, some processes involve post-halogenation recycling by neutralizing HBr to yield sodium bromide (NaBr), washing the NaBr from the halogenated butyl rubber into the aqueous stream, and converting the NaBr to $Br_2$ using $Cl_2$ gas, for example by the Blowout Process. This ex situ recycling method is limited by extraction efficiency of NaBr into the aqueous phase and dilution of the NaBr in the aqueous phase. Further, performing such an ex situ process is cost ineffective and energy intensive.

There remains a need for a cost-effective, efficient process for improving halogen utilization during halogenation of an isoolefin copolymer, for example butyl rubber, especially in the presence of significant amounts of water.

SUMMARY

In one aspect, there is provided a process for producing a halogenated isoolefin copolymer, the process comprising contacting an unsaturated isoolefin copolymer cement, the cement comprising an unsaturated isoolefin copolymer dissolved in an organic solvent, under halogenation conditions with a halogenating agent and an aqueous solution of a potassium salt-based oxidant to form a two-phase reaction medium comprising an organic phase and an aqueous phase, the oxidant capable of converting hydrogen halide to free halogen.

The process may further comprise recovering halogenated isoolefin copolymer containing at least 0.05 mol % of chemically combined halogen.

The present halogenation process advantageously results in increased halogen utilization by oxidizing hydrogen halide (HX) formed during halogenation of the unsaturated isoolefin copolymer back to molecular halogen ($X_2$). The process has less sensitivity to the presence of water in the cement, provides as good or better bromine recovery compared to similar processes (e.g. processes utilizing peracid or hydrogen peroxide) while using less oxidant, and utilizes an oxidant that is more water and temperature stable and easier to handle than oxidants previously used in similar processes. The process does not radically affect the microstructure and molecular weight of the resulting halogenated isoolefin copolymer, and the ability to use less oxidant to achieve the same or better halogenation efficiency is further beneficial to maintaining the microstructure and molecular weight of the halogenated isoolefin copolymer.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
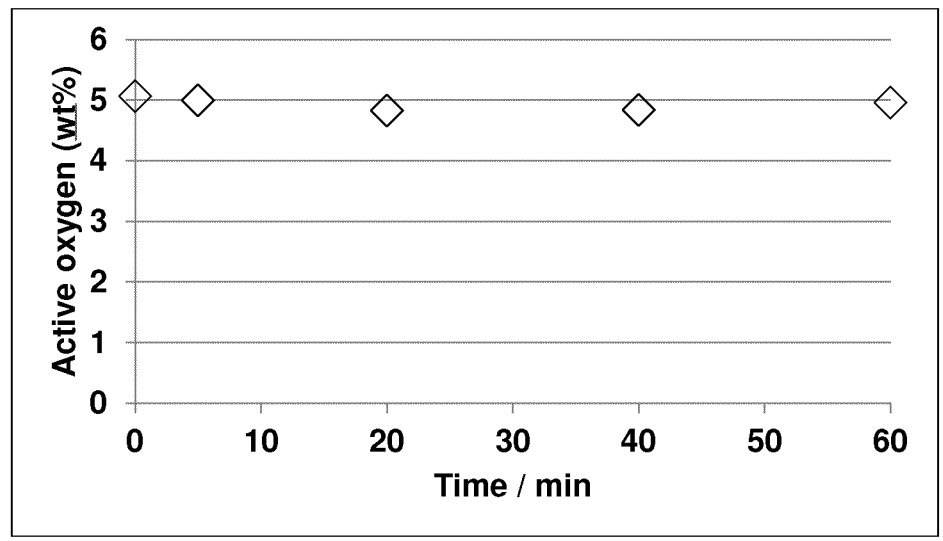
FIG. 1 is a graph of active oxygen (wt %) in potassium peroxymonosulfate samples as a function of time (min) for an aqueous solution of the potassium peroxymonosulfate (0.1 g/mL) at 45° C.

The process involves polymerizing at least one isoolefin monomer and at least one copolymerizable unsaturated monomer in an organic diluent to produce a halogenatable isoolefin copolymer in an organic medium. Polymerization occurs in a polymerization reactor. Suitable polymerization reactors include flow-through polymerization reactors, plug flow reactor, moving belt or drum reactors, and the like. The process preferably comprises slurry polymerization of the monomers.

The halogenatable isoolefin copolymer preferably comprises repeating units derived from at least one isoolefin monomer and repeating units derived from at least one copolymerizable unsaturated monomer, and optionally repeating units derived from one or more further copolymerizable monomers. The halogenatable isoolefin copolymer preferably comprises an unsaturated isoolefin copolymer.

Suitable isoolefin monomers include hydrocarbon monomers having 4 to 16 carbon atoms. In one embodiment, the isoolefin monomers have from 4 to 7 carbon atoms. Examples of suitable isoolefins include isobutene (isobutylene), 2-methyl-1-butene, 3-methyl-1-butene, 2-methyl-2-butene, 4-methyl-1-pentene, 4-methyl-1-pentene and mixtures thereof. A preferred isoolefin monomer is isobutene (isobutylene).

Suitable copolymerizable unsaturated monomers include multiolefins, p-methyl styrene, β-pinene or mixtures thereof. Multiolefin monomers include hydrocarbon monomers having 4 to 14 carbon atoms. In some embodiments, the multiolefin monomers are conjugated dienes. Examples of suitable conjugated diene monomers include isoprene, butadiene, 2-methylbutadiene, 2,4-dimethylbutadiene, piperylene, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene, 1-vinyl-cyclohexadiene and mixtures thereof.

The halogenatable isoolefin copolymer may optionally include one or more additional copolymerizable monomers. Suitable additional copolymerizable monomers include, for example, styrenic monomers, such as alkyl-substituted vinyl aromatic co-monomers, including but not limited to a $C_1$-$C_4$ alkyl substituted styrene. Specific examples of additional copolymerizable monomers include, for example, α-methyl styrene, p-methyl styrene, chlorostyrene, cyclopentadiene and methylcyclopentadiene. Indene and other styrene derivatives may also be used. In one embodiment, the halogenatable isoolefin copolymer may comprise random copolymers of isobutylene, isoprene and p-methyl styrene.

In one embodiment, the halogenatoable isoolefin copolymer may be formed by copolymerization of a monomer mixture. Preferably, the monomer mixture comprises about 80-99.9 mol % of at least one isoolefin monomer and about 0.1-20 mol % of at least one copolymerizable unsaturated monomer, based on the monomers in the monomer mixture. More preferably, the monomer mixture comprises about 90-99.9 mol % of at least one isoolefin monomer and about 0.1-10 mol % of at least one copolymerizable unsaturated monomer. In one embodiment, the monomer mixture comprises about 92.5-97.5 mol % of at least one isoolefin monomer and about 2.5-7.5 mol % of at least one copolymerizable unsaturated monomer. In another embodiment, the monomer mixture comprises about 97.4-95 mol % of at least one isoolefin monomer and about 2.6-5 mol % of at least one copolymerizable unsaturated monomer.

If the monomer mixture comprises the additional copolymerizable with the isoolefins and/or copolymerizable unsaturated monomers, the additional copolymerizable monomer preferably replaces a portion of the copolymerizable unsaturated monomer. When a multiolefin monomer is used, the monomer mixture may also comprise from 0.01% to 1% by weight of at least one multiolefin cross-linking agent, and when the multiolefin cross-linking agent is present, the amount of multiolefin monomer is reduced correspondingly.

The unsaturated isoolefin copolymer may be prepared by any suitable method, of which several are known in the art. For example, the polymerization of monomers may be performed in a diluent in the presence of an initiator system (e.g. a Lewis acid catalyst and a proton source) capable of initiating the polymerization process. A proton source suitable in the present invention includes any compound that will produce a proton when added to the Lewis acid or a composition containing the Lewis acid. Protons may be generated from the reaction of the Lewis acid with proton sources to produce the proton and the corresponding by-product. Such reaction may be preferred in the event that the reaction of the proton source is faster with the protonated additive as compared with its reaction with the monomers. Proton generating reactants include, for example such as water, alcohols, phenol thiols, carboxylic acids, and the like or any mixture thereof. Water, alcohol, phenol or any mixture thereof is preferred. The most preferred proton source is water. A preferred ratio of Lewis acid to proton source is from 5:1 to 100:1 by weight, or from 5:1 to by weight. The initiator system including the catalyst and proton source is preferably present in the reaction mixture in an amount of 0.02-0.1 wt %, based on total weight of the reaction mixture.

Alkyl aluminum halide catalysts are a particularly preferred class of Lewis acids for catalyzing solution polymerization reactions in accordance with the present invention. Examples of alkyl aluminum halide catalysts include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride and any mixture thereof. Preferred are diethyl aluminum chloride ($Et_2AlCl$ or DEAC), ethyl aluminum sesquichloride ($Et_{1.5}AlCl_{1.5}$ or EASC), ethyl aluminum dichloride ($EtAlCl_2$ or EADC), diethyl aluminum bromide ($Et_2AlBr$ or DEAB), ethyl aluminum sesquibromide ($Et_{1.5}AlBr_{1.5}$ or EASB) and ethyl aluminum dibromide ($EtAlBr_2$ or EADB) and any mixture thereof. In a particularly preferred initiator system, the catalyst comprises ethyl aluminum sesquichloride, preferably generated by mixing equimolar amounts of diethyl aluminum chloride and ethyl aluminum dichloride, preferably in a diluent. The diluent is preferably the same one used to perform the copolymerization reaction.

The diluent may comprise an organic diluent. Suitable organic diluents may include, for example, alkanes, chloroalkanes, cycloalkanes, aromatics, hydrofluorocarbons (HFC) or any mixture thereof. Chloroalkanes may include, for example methyl chloride, dichloromethane or any mixture thereof. Methyl chloride is particularly preferred. Alkanes and cycloalkanes may include, for example, isopentane, cyclopentane, 2,2-dimethylbutane, 2,3-dimethylbutane, 2-methylpentane, 3-methylpentane, n-hexane, methylcyclopentane, 2,2-dimethylpentane or any mixture thereof. Alkanes and cycloalkanes are preferably C6 solvents, which include n-hexane or hexane isomers, such as 2-methyl pentane or 3-methyl pentane, or mixtures of n-hexane and such isomers as well as cyclohexane. The monomers are generally polymerized cationically in the diluent at temperatures in a range of from −120° C. to +20° C., preferably −100° C. to −50° C., more preferably −95° C. to −65° C. The temperature is preferably about −80° C. or colder.

Where the diluent comprises chloroalkanes (e.g. methyl chloride) in a slurry polymerization process, the diluent as well as any residual monomers may be removed from the unsaturated isoolefin copolymer by flash separation using steam. Removal of the diluent and residual monomers in such a 'wet' process leaves a polymer containing a significant amount of water. The polymer is dissolved in organic solvent to provide a polymer cement having a significant water content, for example 1 wt % or greater or 1.5 wt % or greater, based on total weight of the cement. In some embodiments, the water content of the cement may be 0-30 wt % or 0-25 wt %, 1-30 wt % or 1.5-15 wt % or 2-30 wt % or 2-20 wt % or 2-15 wt % or 5-20 wt % or 5-15 wt % or 5-10 wt % or 10-15 wt %, based on total weight of the cement.

Where the diluent comprises chloroalkanes (e.g. methyl chloride) or alkanes (e.g. hexanes) in a slurry or a solution polymerization process, the diluent as well as any residual monomers may be removed from the unsaturated isoolefin copolymer by flash separation using a heated organic solvent in which the unsaturated isoolefin copolymer is soluble or by simple distillation. Where simple distillation is used, some of the organic diluent may remain as organic solvent in the cement. Removal of the diluent and residual monomers in such a 'dry' process provides a polymer cement containing less water, for example less than 1 wt %, or even 0 wt %, water based on total weight of the cement.

To form the halogenated isoolefin copolymer, the unsaturated isoolefin copolymer may be subjected to a halogenation process using a halogenating agent under halogenation conditions. Halogenation can be performed by adapting a process known by those skilled in the art (for example the procedures described in Rubber Technology, 3rd Ed., Edited by Maurice Morton, Kluwer Academic Publishers, pp. 297-300 or U.S. Pat. No. 5,886,106 issued Mar. 23, 1999, the contents of both of which are herein incorporated by reference) and modifying the process as described herein.

To improve efficiency of halogenation, the halogenation process is modified by contacting an unsaturated isoolefin copolymer cement, in which the unsaturated isoolefin copolymer is dissolved in an organic solvent, with a halogenating agent and an aqueous solution of a potassium salt-based oxidant. A two-phase reaction medium comprising an organic phase and an aqueous phase is formed. The oxidant in-situ oxidizes halide produced in the halogenation process back into molecular halogen to improve halogen atom efficiency of the halogenation process.

Halogenating agents useful for halogenating the unsaturated isoolefin copolymer may comprise molecular chlorine ($Cl_2$) or molecular bromine ($Br_2$) and/or organo-halide or inorganic halide precursors thereto, for example dibromodimethyl hydantoin, tri-chloroisocyanuric acid (TCIA), n-bromosuccinimide, sodium bromide, hydrogen bromide or the like. Preferably, the halogenating agent comprises chlorine ($Cl_2$) or bromine ($Br_2$), more preferably bromine. Preferably, halogenation comprises bromination. The amount of halogenating agent added is controlled to provide a final halogen content of at least 0.05 mol %, preferably 0.05-2.5 mol %, in the halogenated isoolefin copolymer. The amount of halogenating agent used has a linear relationship with the final halogen content (i.e. the functional halogen amount) on the halogenated isoolefin copolymer. A larger amount of halogenating agent leads to a larger functional halogen amount in the halogenated isoolefin copolymer.

Halogenation is performed in a reaction medium comprising an organic solvent. The organic solvent is preferably an aliphatic solvent. The organic solvent preferably comprises an alkane, more preferably hexanes or pentanes.

Halogenation may be conducted for a length of time to achieve the desired level of halogenation. The length of time is preferably 60 minutes or less. Even at 20 minutes or less, or at 10 minutes or less, or at 5 minutes or less, significant halogenation of the unsaturated isoolefin copolymer may be achieved. Preferably, halogenation is conducted for a minimum of 1 minute. Preferably, the halogenation time is 1-60 minutes, or 1-20 minutes, or 1-10 minutes, or 1-5 minutes.

Halogenation may be conducted at any suitable temperature and is preferably conducted at a temperature up to about 90° C. In some embodiments, the temperature may be up to about 80° C. In other embodiments, the temperature may be up to about 65° C. The increased halogenation efficiency at lower temperatures is more pronounced at higher concentrations of the unsaturated isoolefin copolymer in the reaction medium. Temperatures in a range of 0-70° C. or 0-50° C. or 0-45° C. or 15-45° C. or 20-45° C. or 40-45° C. or 30-70° C. or 20-60° C. or 23-54° C. or 23-45° C. or 10-35° C. or 20-30° C. are preferred. In one embodiment, the unsaturated isoolefin copolymer is cooled before contacting the solution of the unsaturated isoolefin copolymer cement with the halogenating agent and the aqueous solution of oxidant.

The unsaturated isoolefin copolymer is preferably present in the reaction medium in an amount of 1-60 wt %, based on total weight of the reaction medium. More preferably, the unsaturated isoolefin copolymer is present in an amount of 5-50 wt %, even more preferably 5-40 wt %, yet more preferably 10-33 wt %, even yet more preferably 10-30 wt %, for example 20 wt %, based on total weight of the reaction medium.

The aqueous phase is formed from the aqueous solution of oxidant, from water generated by the halogenation reaction and from any additional water contained in the unsaturated isoolefin polymer cement. The aqueous solution of oxidant together with the water generated by the halogenation reaction typically form less than 1 wt % of the reaction medium, for example 0.03-0.3 wt %, based on total weight of the reaction medium.

The reaction medium may contain 0-20 wt %, based on total weight of the reaction medium, of additional water arising from water contained in the unsaturated isoolefin polymer cement depending on the process used to prepare the polymer cement. The additional water is water from the unsaturated isoolefin polymer cement and does not include the water used to prepare the aqueous solution of the oxidant or the water generated by the halogenation reaction. It is an advantage of the present process that the reaction medium may contain significant amounts of additional water, for example 1-20 wt % additional water, based on total weight of the reaction medium. In some embodiments, the additional water may comprise or 1.5-15 wt % or 2-20 wt % or 2-15 wt % or 5-20 wt % or wt % or 5-10 wt % of the reaction medium, based on total weight of the reaction medium. Even so, in some embodiments the reaction medium may contain an insignificant amount of additional water, for example less than 1 wt % additional water, or even 0 wt % additional water, based on total weight of the reaction medium.

The potassium salt-based oxidant preferably comprises a salt of potassium cations with one or more peroxyanions, which have the ability to act as oxidants toward halide ions (e.g. chloride or bromide ions, especially bromide ions). Mixed salts where one or more other cations (e.g. sodium, lithium or the like) may be useable, but salts having only potassium cations are preferable. In some embodiments, the potassium salt-based oxidant comprises $KHSO_5$, $K_2S_2O_8$, KClO, KBrO, $KBrO_3$, $KIO_3$, $KClO_3$, $KClO_4$, $KIO_4$, compounds that generate the aforementioned potassium salt-based oxidants, or mixtures thereof. Preferably, the potassium salt-based oxidant comprises $KHSO_5$ or a compound that generates $KHSO_5$. Potassium peroxymonosulfate is particularly preferred. Potassium peroxymonosulfate generates $KHSO_5$ as the effective oxidant species.

Potassium peroxymonosulfate ($KHSO_5 \cdot 0.5KHSO_4 \cdot 0.5K_2SO_4$), is a commercially available water-soluble potassium triple salt. Potassium peroxymonosulfate is a white crystalline stable solid that is easy to handle, non-toxic, odorless, stable and inexpensive. An aqueous solution of potassium peroxymonosulfate has a pH of 2 and is stable at 45° C. for at least 1 hour, but undergoes decomposition when the pH is greater than 3. Potassium peroxymonosulfate generates only $KHSO_4$ as a byproduct of oxidation. Table 1 compares properties of potassium peroxymonosulfate to other known oxidants. The standard oxidation potential of potassium peroxymonosulfate is 1.85 V, which is close to $H_2O_2$ and peracetic acid, indicating that potassium peroxymonosulfate can oxidize halide into halogen. Potassium peroxymonosulfate has higher temperature of decomposition compared to $H_2O_2$ and peracetic acid, which can facilitate storage and transportation, and prolong shelf-life. Potassium peroxymonosulfate is a solid, which facilitates handling and maintenance of the desired stoichiometry. Potassium peroxymonosulfate generates $KHSO_4$ as the only byproduct, which is easily washed away in the neutralization process. Potassium peroxymonosulfate has no smell, and will therefore not impart any odor on the finished product.

TABLE 1

| Oxidant | Form | Water Solubility | Hexane Solubility | Storage | Oxidation Potential (V) |
|---|---|---|---|---|---|
| NaClO | liquid | soluble | insoluble | fridge (4° C.) | 1.36 |
| Peracetic acid (PAA) | liquid | soluble | slightly soluble | fridge (4° C.) | 1.762 |
| $H_2O_2$ | liquid | soluble | insoluble | fridge (4° C.) | 1.776 |
| Potassium peroxymonosulfate | solid | soluble | insoluble | room T (25° C.) | 1.85 |

Because the potassium salt-based oxidant is substantially insoluble in the organic solvent, a phase transfer catalyst is preferably employed. The phase transfer catalyst preferably both complexes potassium ions to facilitate transfer of the oxidant into the organic phase and emulsifies the aqueous phase in the organic phase to increase surface area contact between the organic and aqueous phases. The use of a phase transfer catalyst together with the potassium salt-based oxidant increases bromine recovery efficiencies beyond efficiencies reported in prior art processes. The phase transfer catalyst preferably provides a host-guest interaction with potassium ions in which a potassium ion is complexed to a plurality of complexation sites on a molecule of the phase transfer catalyst. The complexation sites may comprise atoms (e.g. O, N, S) having one or more lone pairs of electrons that are accessible for complexation with the potassium ions. Preferably, the molecule of the phase transfer catalyst comprises 5 or more complexation sites, more preferably 6 or more complexation sites, yet more preferably 7 or more complexation sites. If the phase transfer molecule is sufficiently large with a sufficiently large number of complexation sites, one phase transfer molecule may form a complex with two or more potassium ions. The phase transfer molecule may be acyclic or cyclic, or comprise both acyclic and cyclic portions. Acyclic molecules or portions thereof may be linear or branched. The phase transfer molecule is preferably a non-ionic surfactant. The phase transfer catalyst preferably comprises a plurality of ethylene oxide units therein, preferably 3-20 ethylene oxide units therein. The phase transfer catalyst preferably comprises at least one hydrocarbon chain. Preferably, the phase transfer catalyst comprises a plurality of oxygen atoms to which the potassium ion is complexed. The phase transfer catalyst preferably comprises a polyalkylene oxide ether, for example a polyethylene glycol. The polyalkylene oxide ether is preferably alkylated to increase solubility in the organic phase.

In some embodiments, the phase transfer catalyst comprises a Lutensol™ series compound, a Tween™ series compound, Triton™ X-100, Polyglycerol polyricinoleate, Poloxamer™ 407, Poloxamer™, Polidocanol™, Pentaethylene glycol monododecyl ether, PEG-10 sunflower glycerides, Octaethylene glycol monododecyl ether, NP-40, Nonoxynol™-9, Isoceteth™-20, Cetomacrogol™ 1000, or mixtures thereof.

The oxidant and phase transfer catalyst are preferably present in the aqueous solution in a molar ratio in a range of 1:3 to 100:1, or 1:3 to 75:1. Especially where there are sufficient complexation sites on the phase transfer molecule to accommodate only a single potassium ion, the oxidant and phase transfer catalyst are preferably present in the aqueous solution in a molar ratio of 1:1.

The oxidant and phase transfer catalyst are preferably premixed in the aqueous solution prior to introducing the aqueous solution into the reaction medium the cement, but it is possible under some circumstances to introduce the oxidant and phase transfer catalyst separately into the reaction medium containing the cement, preferably by adding the phase transfer catalyst first, followed by the oxidant. The oxidant and phase transfer catalyst are preferably added to the reaction medium prior to introducing the halogenating agent.

The concentration of oxidant present in the reaction medium is preferably at least moles of oxidant per mole of halogenating agent, or at least 0.1 moles of oxidant per mole of halogenating agent. The concentration of oxidant present in the reaction medium is preferably 0.2-5 moles, more preferably 0.25-4 moles, yet more preferably 0.5-3 moles, of oxidant per mole of halogenating agent. The desired concentration of oxidant is a function of the desired halogenation time. For a halogenation time of 5 minutes, 0.5-2 moles, for example 2 moles, of oxidant per mole of halogenating agent is preferred. Lower concentrations of oxidant may be offset by longer halogenation time. Adjusting stirring rate of the reaction medium can lead to improvement in the efficiency of the halogenation.

In the present process, all or some of the halogenating agent may comprise hydrogen halide (HX) added to the aqueous phase. Because HX is converted into molecular halogen ($X_2$) by the oxidant in the aqueous phase, the added HX can act as a source of halogenating agent.

EXAMPLES

Scheme 1 illustrates an example of the process for producing a halogenated isoolefin copolymer. As illustrated in Scheme 1, with $Br_2$ as the halogenating agent, $KHSO_5$ as the effective oxidant and Lutensol™ TO5 as the phase transfer catalyst, the oxygen atom complexation sites on the phase transfer catalyst form ion dipole interactions with the potassium ion of the $KHSO_5$. In addition, hydrogen bonding interactions are formed between $HSO_5^-$ and both the oxygen atoms and hydroxyl hydrogen atoms of the phase transfer catalyst. In this manner, the phase transfer catalyst is able to extract the oxidant from the aqueous phase to effect oxidation of the HBr produced in the organic phase back into $Br_2$. In addition, bromide ions that migrate into the aqueous phase can be oxidized by the oxidant to reform $Br_2$, which will preferentially transfer back into the organic phase. In this way, the efficiency of bromine usage in the bromination reaction can be increased.

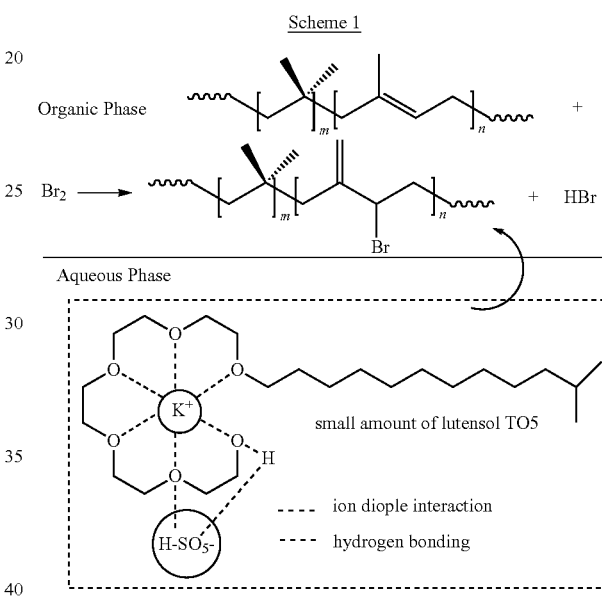

Scheme 1

Materials and Methods

Isobutylene-isoprene polymer (IIR) and Epoxidized Soybean Oil (ESBO) were obtained from ARLANXEO (Sarnia, Ontario, Canada site). The remaining materials were used as received: Potassium Peroxymonosulfate (Oxone™ with active oxygen greater than 4 wt % from Sigma Aldrich), Potassium Bromate (Sigma-Aldrich), Sodium Hypochlorite (available chlorine 10-15%), Lutensol™ TO3 (BASF), Lutensol™ TO5 (BASF), Lutensol™ TO8 (BASF), Tween™ 20 (Taiko), Hexanes (VWR), Isopentane (Sigma-Aldrich), Sodium Hydroxide (VWR), 99.99% Bromine (Sigma Aldrich), 30 wt % Hydrogen Peroxide (Sigma-Aldrich), 32 wt % Peracetic Acid solution (Sigma-Aldrich), Calcium Stearate (Alfa Aesar) and Irganox™-1010 (BASF).

Bromination Reactions 250 g of isobutylene-isoprene copolymer (butyl rubber, IIR) was cut into small pieces and added to a 5 L jacketed reactor equipped with an overhead stirrer, and prefilled with "X" mL of hexanes or isopentane. Stir speed was set to 150 rpm while the base material pieces were added to the reactor. The solution was stirred for 24 hours to fully dissolve the butyl rubber. After the isobutylene-isoprene copolymer had fully dissolved, "Y" mL of water was added to the reactor via a pipette to provide a butyl rubber cement. In Examples where an oxidant was used for bromine recovery, the oxidant was first dissolved in "Z" mL water, followed by the addition of the resulting aqueous solution to the reactor. In Examples where both a phase transfer catalyst and oxidant were used, the phase transfer catalyst and oxidant were first dissolved in "Z" mL water, followed by the addition of the resulting aqueous solution to the reactor. The amounts of oxidant and phase transfer catalyst were shown in the Examples. The values of X, Y and Z are chosen to provide butyl rubber cements with the water contents in the Examples below.

A circulating bath connected to the jacketed reactor was set to desired temperature to heat reactor and the butyl rubber cement was stirred at 350 rpm for 30 minutes at a desired temperature shown in the examples. Then bromine ($Br_2$) (2.15 mL, 6.71 g, 0.042 moles) was added with a syringe, and the reaction was stirred for 1 hour.

During the 1-hour period, 10 mL samples of the reaction medium were extracted with a pipette at 5, 20, 40 and 60 minutes, and added to vials containing 10 mL of 2.5 M NaOH, whereupon the vials were shaken vigorously to quench residual bromine, HBr and oxidant. The halogenated polymer samples in the vial were then collected by precipitating the polymer solution into ethanol and drying the precipitate under vacuum at 60° C. for 48 h.

After the 1-hour period, pre-determined amount of a 2.5 M NaOH solution was added to the remaining reaction medium to quench the reaction. An additional 250 mL of water was added to aid in mixing. The mixture was continued to stir at 350 rpm for 5 minutes. An additional 1 L of water was added and allowed to stir at 350 rpm for another 5 minutes. Stirring was reduced to 150 rpm and the was stirred for an additional 5 minutes. The reactor stirring was stopped and the water phase was drained through the bottom drain valve. The cement of brominated isobutylene-isoprene copolymer was washed with additional water until the pH was 7, to remove any residual inorganic salts. A solution of polymer stabilizers (4.52 g of calcium stearate, 0.125 g of Irganox™-1010, and 3.25 g of ESBO) in hexanes was added to the reactor and the cement stirred for 5 minutes. The cement was drained and steam coagulated using low pressure steam for about 1 hour. A small piece of the brominated polymer sample was cut from the final product and dried in the vacuum oven at 60° C. overnight.

The micro-structures and bromine content of the dry samples were analyzed using $^1$H-NMR spectroscopy.

Bromine Utilization Calculations

Bromine utilization in the bromination process may be measured using bromine atom efficiency (BAE), which is given by the following equation:

$$BAE\ (\%) = \frac{\text{atoms of } Br \text{ on polymer}}{\text{atoms of } Br \text{ from bromine added to reaction}} \times 100\%$$

Atoms of Br on polymer is calculated from $^1$H-NMR. Atoms of Br from bromine added to the reaction is calculated by volume of bromine used in reaction. From the equation, it is evident that ideal conditions would yield a BAE of 50%, where 50% of the Br is in waste HBr. Therefore, the theoretical maximum fraction of bromine present in the reaction mixture which can be introduced into the butyl rubber polymer is 50%. However, in practice the BAE is usually less than 45%, for example 30-45% or 35-45%.

In some previous methods (e.g. in U.S. Pat. Nos. 3,018,275 and 5,681,901) bromine utilization is measured using molecules of molecular bromine added to the reaction, which provides numerical results that are double the BAE because there are two atoms of bromine in every molecule of molecular bromine. Further, these previous methods use X-ray diffraction in order to estimate the amount of Br bound to the polymer. However, this method will also measure NaBr arising from the neutralization process, and which is trapped within the polymer matrix. Trapped NaBr does not necessarily measure the amount of Br chemically bound to the polymer, and generally provides numbers for bromine utilization efficiency that are higher than the actual efficiency.

Stability of Potassium Peroxymonosulfate

Temperature stability of potassium peroxymonosulfate in an aqueous solution was determined to assess suitability of potassium peroxymonosulfate as an oxidant to recover bromine in the bromination of a butyl rubber.

mL of 0.1 mg/L potassium peroxymonosulfate aqueous solution was placed in a water bath preheated to 45° C. At different time intervals, 1.0 mL of 0.1 g/mL of the potassium peroxymonosulfate aqueous solution was added to a tared 250 mL Erlenmeyer flask, and the mass of the solution was recorded. Afterwards, the solution was titrated against a 0.1 N standard sodium thiolsulfate solution. The procedure for the titration is based on the data sheet for Oxone™ which is described as follows.

75 mL deionized water, 10 mL 20% (v/v) sulfuric acid, and 10 mL 25% (w/w) potassium iodide solution were added to a 250 mL Erlenmeyer flask containing 1.0 mL of the 0.1 mg/mL potassium peroxymonosulfate aqueous solution. The specimen was immediately titrated against with 0.1 N sodium thiosulfate solution to a pale-yellow color. Afterwards, 3 mL of starch indicator solution was added, and the solution tuned deep blue. The titration continued to a colorless endpoint that persisted for at least 30 seconds. The active oxygen content was calculated according to the following equation:

$$\%\ \text{active oxygen} = \frac{mLthio \times Nthio \times 0.008 \times 100}{\text{Specimen weight (g)}}$$

where mLthio is the volume of the sodium thiosulfate solution and Nthio is the normality of the sodium thiosulfate solution.

The results are shown in FIG. 1, which illustrates that the active oxygen is 5 wt %, which is in agreement with the technical data sheet from the supplier, and that there is no change in the active oxygen within one hour. Thus, the potassium peroxymonosulfate is stable at 45° C. at the temperature and during the time period of a bromination process for butyl rubber.

Example 1: Effect of Potassium Peroxymonosulfate in the Bromination of IIR

Bromination reactions were performed as described above in which the amount of butyl rubber (IIR) was 20 wt % based on total weight of the reaction medium, and the amount of added water was 5 wt % based on total weight of the reaction medium. The IIR had 1.78 mol % unsaturation.

Process P1 was a control where no bromine recovery was attempted as no oxidant was added. Process P2 utilized 6.4 g of potassium peroxymonosulfate as an oxidant to recycle bromine, which provided a molar ratio of oxidant:$Br_2$ of 1:2, which is 0.5 equivalents of oxidant to bromine molecules. Process P3 utilized 6.4 g of potassium peroxymonosulfate as an oxidant and 120 mg of Lutensol™ TO5 as a phase transfer catalyst (PTC). Lutensol™ TO5 is isotridecyl alcohol polyoxyethylene ether, which is a derivative of polyethylene glycol (PEG). Table 2 provides results for samples extracted from the reaction media at the 60-minute time mark of the respective processes P1, P2 and P3.

As seen in Table 2, comparing P1 to P2, functional Br increased from 0.61 mol % to mol % at the 60-minute mark when only 0.5 equivalent of potassium peroxymonosulfate was used as an oxidant, which indicates that bromine recycling is occurring in the presence of the potassium peroxymonosulfate oxidant. However, the inclusion of the phase transfer catalyst, Lutensol™ T05, further increases functional Br to 0.85% (P3), which is an 18% improvement over potassium peroxymonosulfate alone.

TABLE 2

IIR (20 wt %), Water (5 wt %), Temperature (45° C.), $Br_2$ (0.042 moles)

| Process | Oxidant (g) | PTC (mg) | Functional Br (mol %) | BAE (%) |
|---|---|---|---|---|
| P1 | 0 | 0 | 0.61 | 32.4 |
| P2 | 6.4 | 0 | 0.72 | 38.2 |
| P3 | 6.4 | 120 | 0.85 | 45.1 |

Figure 2:
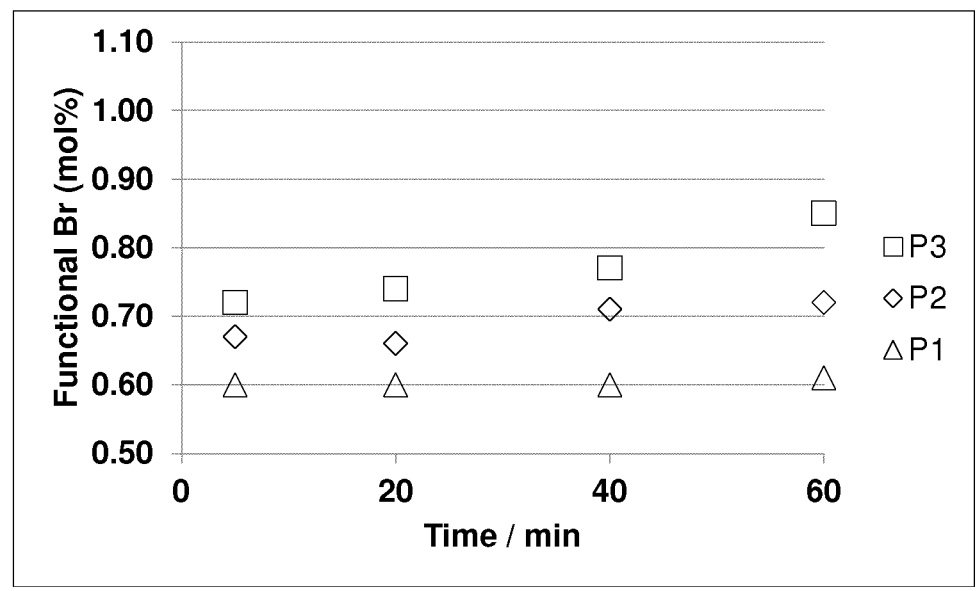
FIG. 2 is a graph of functional Br (mol %) vs. reaction time (min) for bromination of butyl rubber cement containing 20 wt % butyl rubber (IIR) and 5 wt % added water at 45° C. in the presence of: no oxidant and no phase transfer catalyst (triangles); 6.4 g potassium peroxymonosulfate oxidant (diamonds); and, 6.4 g potassium peroxymonosulfate oxidant with 120 mg Lutensol™ TO5 phase transfer catalyst (squares).

Functional Br was determined as a function of reaction time by analyzing samples for each of the processes P1, P2 and P3 taken at the 5-minute, 20-minute, 40-minute and time marks. FIG. 2 shows that functional Br does not increase over time in the control process (P1, triangles), whereas functional Br increases for both processes P2 (diamonds) and P3 (squares), which utilize potassium peroxymonosulfate oxidant. The greatest increase in functional Br over time occurs when the oxidant is complexed with a phase transfer catalyst (P3, squares).

Figure 3:
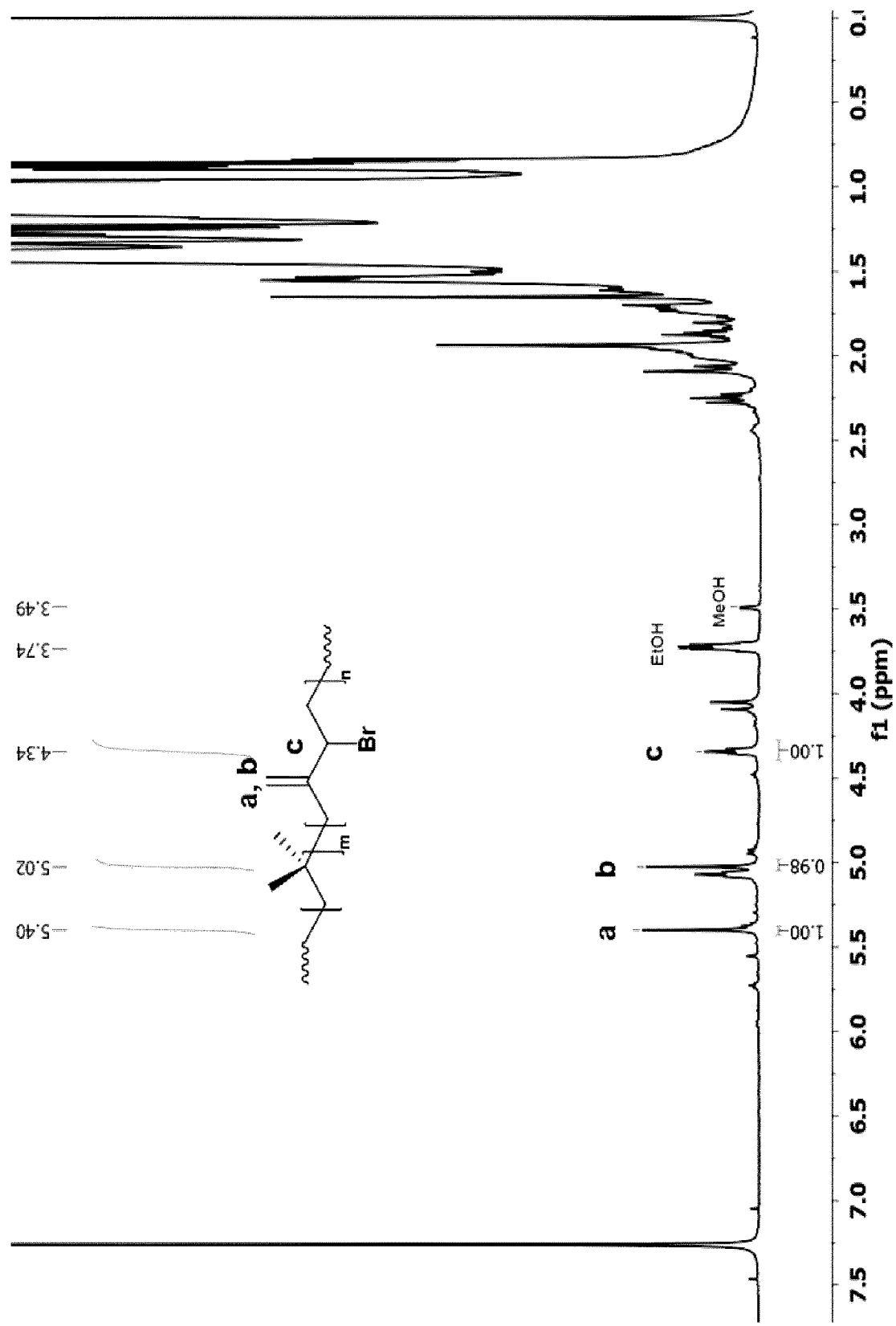
FIG. 3 is a portion of the $^1$H NMR spectrum in $CDCl_3$ for a brominated butyl rubber produced in $CDCl_3$ in the presence of potassium peroxymonosulfate.

The $^1$H NMR spectrum of the brominated butyl rubber from the 60-minute mark of P2 was analyzed to see whether the microstructure is the same as the brominated butyl rubber sample from P1. As seen in FIG. 3, for the butyl rubber from process P2, the appearance of the resonance signals at 5.4 ppm, 5.02 ppm and 4.34 ppm suggest the formation of brominated butyl rubber. The integration ratio of a:b:c is 1:1:1, which also matches the chemical structure of the brominated butyl rubber from P1. It is known that when potassium peroxymonosulfate is used to epoxidize an olefin, there is a resulting chemical shift to 2.7 ppm. This peak was not observed in the $^1$H NMR spectrum of the sample from P2, indicating that no epoxidized butyl rubber contaminant was produced.

Figure 4A:
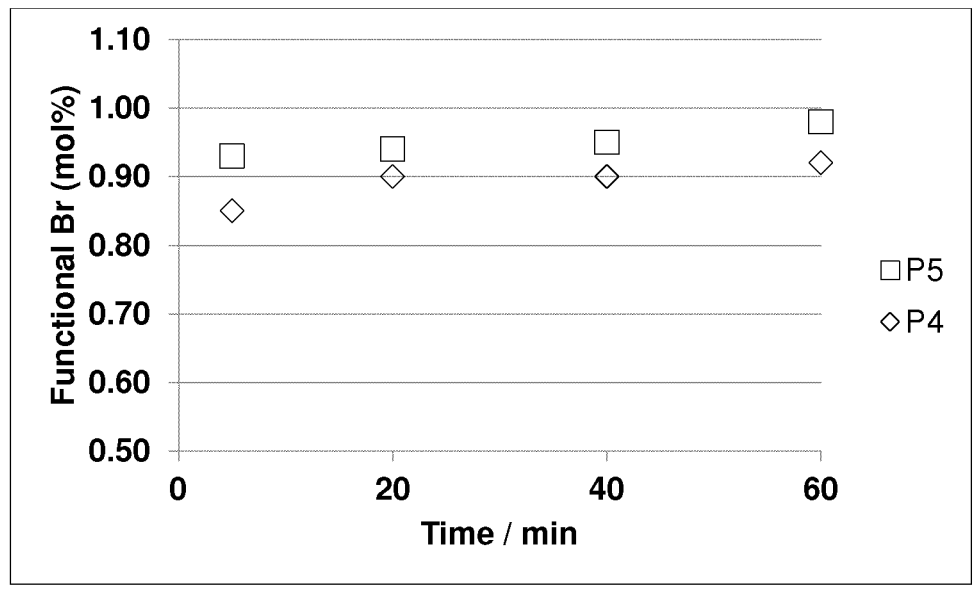
FIG. 4A is a graph of functional Br (mol %) vs. reaction time (min) for bromination of butyl rubber cement containing 20 wt % butyl rubber (IIR), 6.4 g potassium peroxymonosulfate oxidant and 240 mg Lutensol™ TO5 phase transfer catalyst at 45° C. with 5 wt % added water (diamonds) and 15 wt % added water (squares).

Example 2: Water Sensitivity of Potassium Peroxymonosulfate in the Bromination of IIR To determine water sensitivity of the potassium peroxymonosulfate oxidant, bromination processes P4 and P5 were performed as described above except for the changes in conditions shown in Table 3. The IIR had 1.78 mol % unsaturation. Samples from P4 and P5 were extracted from the reaction medium at the 60-minute time mark of the respective processes. As seen in Table 3 and FIG. 4A, when 240 mg of Lutensol™ TO5 phase transfer catalyst (PTC) (sample from P4) was used, the functional Br increased to mol % compared to 0.85 mol % functional Br when 120 mg Lutensol™ TO5 was used (sample from P3 in Table 2). Also, the use of a larger amount of Lutensol™ TO5 accelerates bromination and bromine recovery as the functional bromine level reached a plateau after 20 minutes (see FIG. 4A), which is different from P3 (see FIG. 2) where one hour was required for the functional Br to plateau. It is evident from Table 3 and FIG. 4A that the ability of potassium peroxymonosulfate to recycle bromine is not very sensitive to differences in the amount of water added to the butyl rubber bromination process.

TABLE 3

IIR (20 wt %), Temperature (45° C.), $Br_2$ (0.042 moles)

| Process | Water (wt %) | Oxidant (g) | PTC (mg) | Functional Br (mol %) | BAE (%) |
|---|---|---|---|---|---|
| P4 | 5 | 6.4 | 240 | 0.92 | 48.8 |
| P5 | 15 | 6.4 | 240 | 0.98 | 52.0 |

Figure 4B:
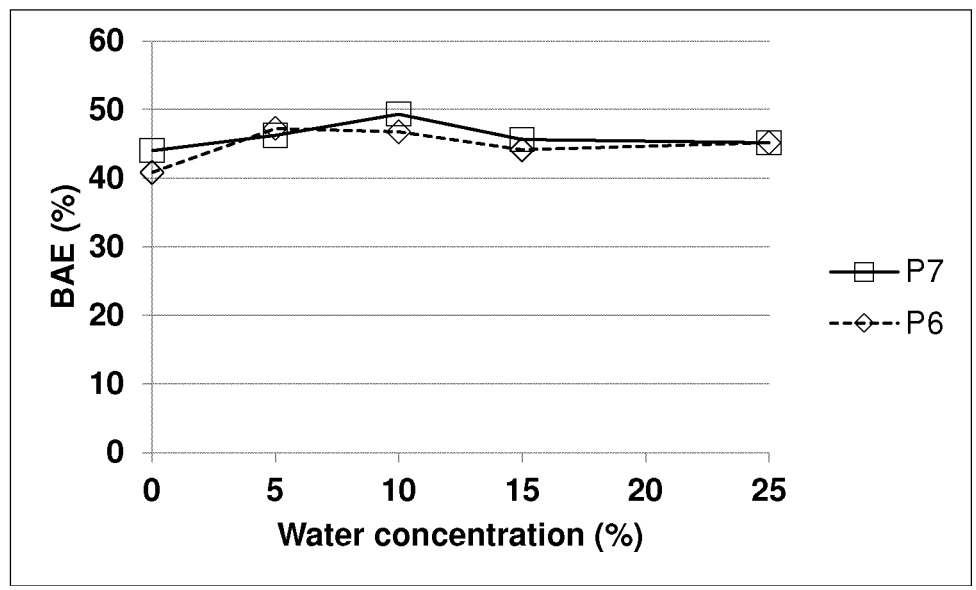
FIG. 4B is a graph of bromine atom efficiency (BAE) (%) vs. added water concentration (wt %) for bromination of butyl rubber cement containing 20 wt % butyl rubber (IIR), 3.2 potassium peroxymonosulfate oxidant and 240 mg Lutensol™ TO5 phase transfer catalyst at 45° C. with samples taken after 5 min (diamonds) and 60 min (squares).

In another experiment, added water concentration in the butyl rubber cement was varied from 0 wt % to 25 wt % to provide five different bromination reactions containing 20 wt % IIR, 3.2 g potassium peroxymonosulfate oxidant, 240 mg Lutensol™ TO5 phase transfer catalyst and 0.042 moles $Br_2$, the brominations performed at 45° C. over a period of minutes. Samples were taken at the 5-minute (P6) and 60-minute (P7) marks and the bromine atom efficiency (%) in each sample was determined. As seen in FIG. 4B, BAE increases a small amount between 0 wt % and 10 wt % added water, and then tapers off back to the same BAE as the 0 wt % water sample. Overall, the ability of potassium peroxymonosulfate to recycle bromine is not very sensitive to differences in the amount of water added to the butyl rubber bromination process.

Example 3: Effect of Amount and Type of Phase Transfer Catalyst in the Bromination of IIR The effect of amount of Lutensol™ TO5 on the bromination of IIR was first examined, as illustrated by bromination processes P8-P10 in Table 4A. The IIR had 1.78 mol % unsaturation. At the 60-minute mark, BAE increased when the Lutensol™ TO5 increased from 60 mg to 240 mg (P8, P9). Further increasing the Lutensol™ TO5 to 480 mg (P10) resulting a slightly decrease in BAE, but still above the process P2 in which no Lutensol™ TO5 was added while two times of oxidant was used. Therefore, the BAE peaks when 240 mg Lutensol™ TO5 was used.

TABLE 4A

IIR (20 wt %), Water (10 wt %), Temperature (45° C.), $Br_2$ (0.042 moles), Oxidant (0.01 mol)

| Process | Oxidant (g) | PTC (mg) | PTC (type) | BAE (%) |
|---|---|---|---|---|
| P8 | 3.2 | 60 | Lutensol ™ TO5 | 45.1 |
| P9 | 3.2 | 240 | Lutensol ™ TO5 | 48.8 |
| P10 | 3.2 | 480 | Lutensol ™ TO5 | 45.6 |

Lutensol™ products are nonionic molecules having the general formula: $RO(CH_2CH_2O)_nH$, where R is iso-$C_{13}H_{27}$, and n is 3, 5, 6, 6.5, 7, 8, 10, 12, 15 or 20, where n defines the degree of ethoxylation. In Lutensol™ TO3, n is 3. In Lutensol™ TO5, n is 5. In Lutensol™ TO8, n is 8. The structure of Lutensol™ series compounds is:

In addition to Lutensol™ TO5, Lutensol™ TO8 and Lutensol™ TO3 were also tried for the brominatioin (P12 and P13 in Table 4B). The experimental results at the 60-minute nark are compared with P11 in which Lutensol™ TO5 was used. (P11 is the same experiment as P5). The number of ethylene glycol units in 240 mg Lutensol™ TO5, 209 mg Lutensol™ TO8 and 316.3 mg Lutensol™ TO3 are the same. As illustrated in Table 4B, BAE remains unchanged when Lutensol™ TO8 and Lutensol™ TO3 were used compared to Lutensol™ TO5. It has been reported that the minimum number of ethylene glycol units is 7 to achieve a good complexation with potassium ion. However, when the ethylene glycol chain is shorter, the partition of the phase transfer catalyst in organic phase improved as it becomes less water soluble, which can explain the brominations results when Lutensol™ TO3 is used.

TABLE 4B

| IIR (20 wt %), Water (15 wt %), Temperature (45° C.), Br$_2$ (0.042 moles), Oxidant (0.02 mol) | | | | |
|---|---|---|---|---|
| Process | Oxidant (g) | PTC (mg) | PTC (type) | BAE (%) |
| P11 (P5) | 6.4 | 240 | Lutensol ™ TO5 | 52.0 |
| P12 | 6.4 | 209 | Lutensol ™ TO8 | 50.4 |
| P13 | 6.4 | 316.3 | Lutensol ™ TO3 | 52.5 |

Tween™ 20 is also called PEG(20)sorbitan monolaurate or Polysorbate 20, which is a nonionic molecule based on polyethylene glycol. The structure of Tween™ series compounds is the following, where w+x+y+z is 20 for Tween™ 20 and 80 for Tween™ 80:

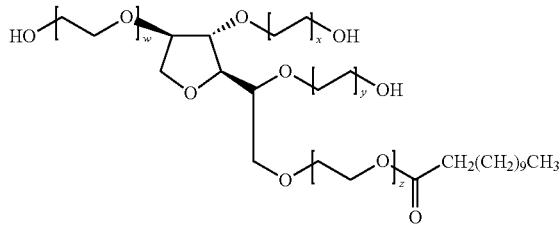

For a 1 h reaction, the bromination in the presence of Tween™ 20 (P15) suggests that bromine recovery is slightly improved when Tween™ 20 (P15) is used instead of Lutensol™ TO5.

TABLE 4C

| IIR (20 wt %), Water (15 wt %), Temperature (45° C.), Br$_2$ (0.042 moles), Oxidant (0.01 mol) | | | | |
|---|---|---|---|---|
| Process | Oxidant (g) | PTC (mg) | PTC (type) | BAE (%) |
| P14 | 3.2 | 240 | Lutensol ™ TO5 | 45.6 |
| P15 | 3.2 | 172 | Tween ™ 20 | 49.3 |

Example 4: Effect of Amount of Potassium Peroxymonosulfate in the Bromination of IIR To determine the effect of the amount of potassium peroxymonosulfate oxidant, three sets of brominations are performed, which are brominations with 20 wt % IIR and 5 wt % water (Table 5A, FIG. 5A), brominations with 20 wt % IIR and 10 wt % water (Table 5B, FIG. 5B) and brominations with 20 wt % IIR and 15 wt % water (Table 5C, FIG. 5C).

Figure 5A:
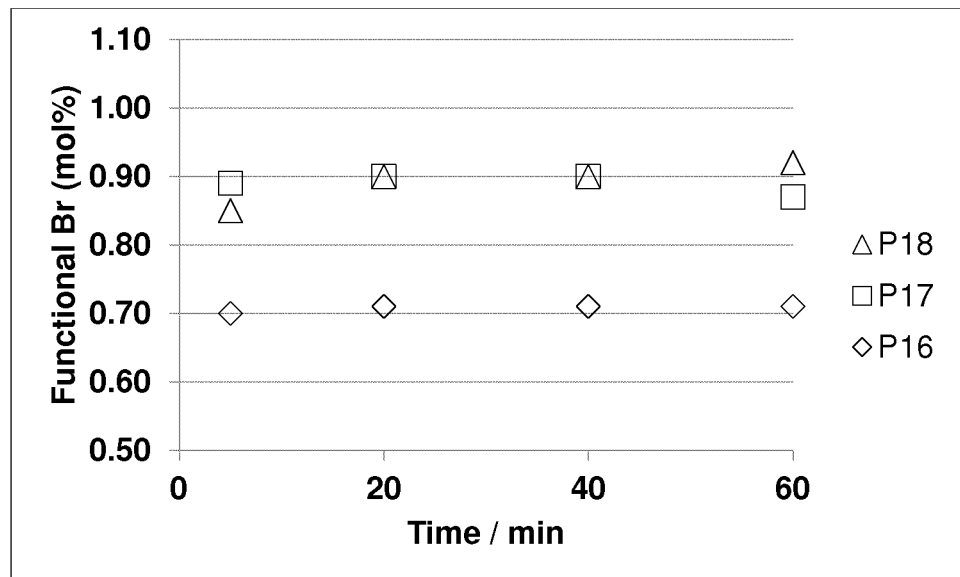
FIG. 5A is a graph of functional Br (mol %) vs. reaction time (min) for bromination of butyl rubber cement containing 20 wt % butyl rubber (IIR), 5 wt % added water at 45° C. with: no oxidant and 240 mg Lutensol™ TO5 phase transfer catalyst (diamonds); 3.2 g potassium peroxymonosulfate oxidant and 240 mg Lutensol™ TO5 phase transfer catalyst (squares); 6.4 g potassium peroxymonosulfate oxidant and 240 mg Lutensol™ TO5 phase transfer catalyst (triangles).

As seen in FIG. 5A, compared to P16 in which no oxidant was added. P17 and P18 (P18 is the same experiment as P4) showed increased functional Br and BAE, indicating the occurrence of bromine recovery. In addition, reducing the amount of potassium peroxymonosulfate by half does not reduce functional Br by too much (compare P17 (squares) to P18 (triangles). Further, only 0.25 equivalent of potassium peroxymonosulfate compared to Br$_2$ (i.e., a 1:4 mole ratio) is required to achieve 0.9 mol % functional Br (see P17 (squares), which compares favorably to the use of peracetic acid (PAA) which requires 0.5 equivalent (1:2 mole ratio) to achieve 0.9 mol % functional Br.

TABLE 5A

| IIR (20 wt %), Water (5 wt %), Temperature (45° C.), Br2 (0.042 moles) | | | |
|---|---|---|---|
| Process | Oxidant (g) | PTC | BAE (%) |
| P16 | 0 | 240 mg Lutensol ™ TO5 | 38.2 |
| P17 | 3.2 | 240 mg Lutensol ™ TO5 | 46.2 |
| P18 (P4) | 6.4 | 240 mg Lutensol ™ TO5 | 48.8 |

Figure 5B:
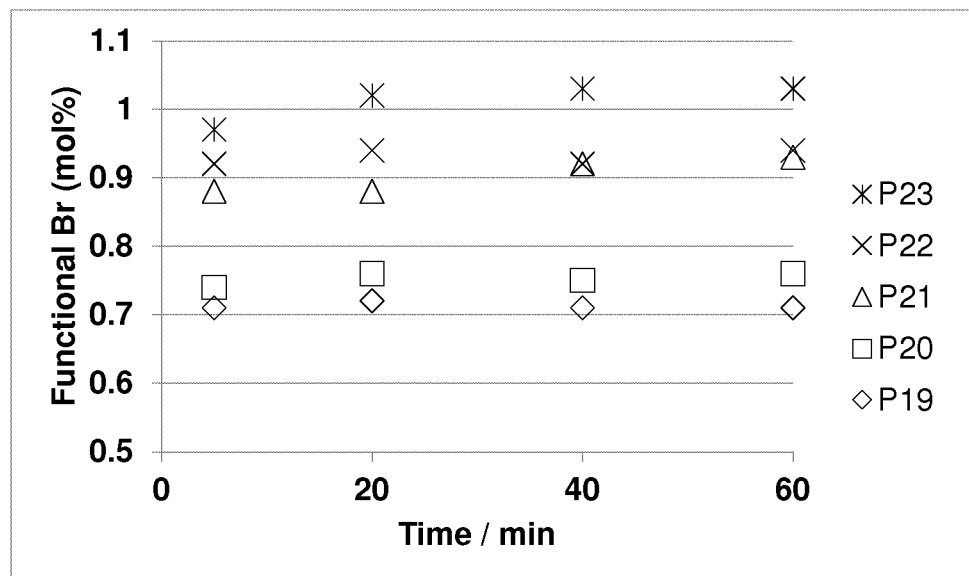
FIG. 5B is a graph of functional Br (mol %) vs. reaction time (min) for bromination of butyl rubber cement containing 20 wt % butyl rubber (IIR), 10 wt % added water at 45° C. with: no oxidant and 240.0 mg phase transfer catalyst (diamonds); 1.6 g potassium peroxymonosulfate oxidant and 240 mg Lutensol™ TO5 phase transfer catalyst (squares); 3.2 g potassium peroxymonosulfate oxidant and 240 mg Lutensol™ TO5 phase transfer catalyst (triangles); 6.4 g potassium peroxymonosulfate oxidant and 240 mg Lutensol™ TO5 phase transfer catalyst (Xs); and, 9.6 g potassium peroxymonosulfate oxidant and 240 mg Lutensol™ TO5 phase transfer catalyst (stars).

A second set of bromination processes P19, P20, P21, P22, and P23, with 10 wt % were performed as described above except for the changes in conditions shown in Table 5B. Process P19 is a control process in which no oxidant was used. As seen in FIG. 5B, increasing the amount of potassium peroxymonosulfate generally increases functional Br. Similar to the first set of experiments, reducing the amount of potassium peroxymonosulfate by half does not reduce functional Br by too much (compare P21 (triangles) to P22 (Xs). Further, only 0.25 equivalent of potassium peroxymonosulfate compared to Br$_2$ (i.e., a 1:4 mole ratio) is required to achieve 0.9 mol % functional Br (see P21 (triangles).

TABLE 5B

| IIR (20 wt %), Water (10 wt %), Temperature (45° C.), Br$_2$ (0.042 moles) | | | |
|---|---|---|---|
| Process | Oxidant (g) | PTC | BAE (%) |
| P19 | 0 | 240 mg Lutensol ™ TO5 | 38.2 |
| P20 | 1.6 | 240 mg Lutensol ™ TO5 | 40.3 |
| P21 | 3.2 | 240 mg Lutensol ™ TO5 | 49.3 |
| P22 | 6.4 | 240 mg Lutensol ™ TO5 | 49.9 |
| P23 | 9.6 | 240 mg Lutensol ™ TO5 | 54.6 |

Figure 5C:
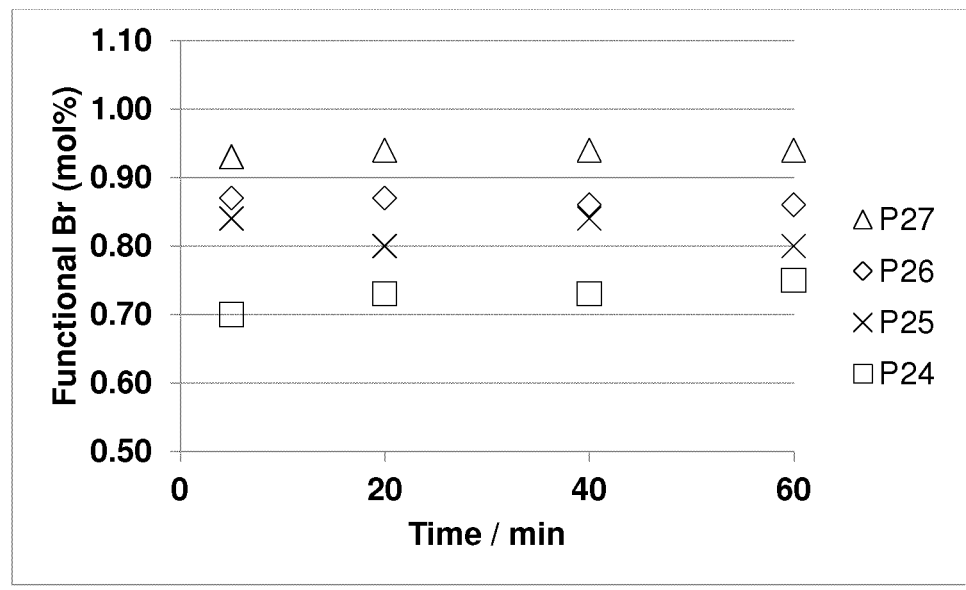
FIG. 5C is a graph of functional Br (mol %) vs. reaction time (min) for bromination of butyl rubber cement containing 20 wt % butyl rubber (IIR), 15 wt % added water at 45° C. with: no oxidant and 240 mg Lutensol™ TO5 phase transfer catalyst (squares); 1.6 g potassium peroxymonosulfate oxidant and 240 mg Lutensol™ TO5 phase transfer catalyst (Xs); 3.2 g potassium peroxymonosulfate oxidant and 240 mg Lutensol™ TO5 phase transfer catalyst (diamonds); 6.4 g potassium peroxymonosulfate oxidant and 240 mg Lutensol™ TO5 phase transfer catalyst (triangles).

A third set of bromination processes P24, P25, P26, and P27 with 15 wt % were performed as described above except for the changes in conditions shown in Table 5C. (P26 is the same experiment as P14.) Process P24 is a control process in which no oxidant was used. As seen in FIG. 5C and Table 5C, increasing the amount of potassium peroxymonosulfate generally increases functional Br and BAE. Further, only 0.25 equivalent of potassium peroxymonosulfate compared to $Br_2$ (i.e. a 1:4 mole ratio) is required to achieve 0.86 mol % functional Br (see P26 (diamonds). By comparing the BAE from P17 (46.2%), P21 (49.3%) and P26 (45.6%), it is apparent that the bromine recovery is not compromised when the water concentration increased from 5 wt % to 15 wt %, indicating that the bromine recover is not sensitive to the water concentration in the cement, which is consistent with the results from Example 2.

TABLE 5C

| IIR (20 wt %), Water (15 wt %), Temperature (45° C.), $Br_2$ (0.042 moles) | | | |
|---|---|---|---|
| Process | Oxidant (g) | PTC | BAE (%) |
| P24 | 0 | 240 mg Lutensol ™ TO5 | 39.8 |
| P25 | 1.6 | 240 mg Lutensol ™ TO5 | 42.5 |
| P26 (P14) | 3.2 | 240 mg Lutensol ™ TO5 | 45.6 |
| P27 | 6.4 | 240 mgLutensol ™ TO5 | 49.9 |

Example 5: Effect of Cement Concentration in the Bromination of IIR

Figure 6:
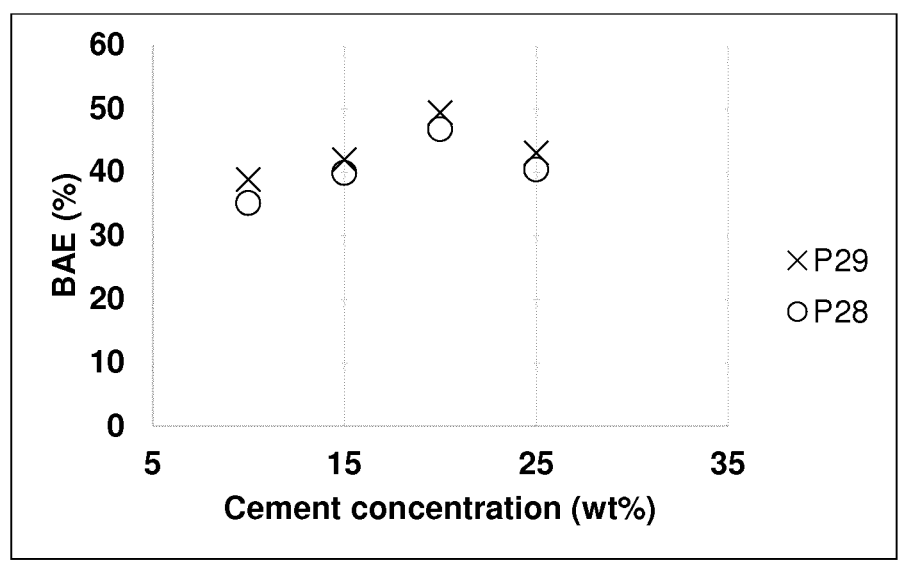
FIG. 6 is a graph of BAE vs. concentration of butyl rubber (IIR) (wt %) for bromination of butyl rubber cement containing 20 wt % butyl rubber (IIR), 10-25 wt % added water at with 3.2 g potassium peroxymonosulfate oxidant and 240 mg Lutensol™ TO5 phase transfer catalyst at 5 mins (circles) and 60 mins (Xs).

Butyl rubber cements were obtained from slurry polymerization of isobutene and isoprene in methyl chloride according to known methods to provide cements having a water content of 10 wt % and butyl rubber (IIR) content of 10-33 wt %. These cements were brominated at 45° C. following the procedure described above using 3.2 g potassium peroxymonosulfate and 240 mg Lutensol™ TO5. FIG. 6 shows that the bromination efficiency peaks when the IIR concentration is around 20 wt %. This result is consistent with bromination results when peracid was used as the oxidant.

Process P28: 5 mins bromination, cement concentration is 10 wt %, 15 wt %, 20 wt % and wt %, 10 wt % water, 3.2 g potassium peroxymonosulfate, 240 mg Lutensol™ TO5.

Process P29: 60 mins bromination, cement concentration is 10 wt %, 15 wt %, 20 wt % and wt %, 10 wt % water, 3.2 g potassium peroxymonosulfate, 240 mg Lutensol™ TO5.

Example 6: Effect of Formation of Oxidant/PTC Complex in the Bromination of IIR

To determine whether preliminary formation of an oxidant/phase transfer catalyst complex is important for bromine recovery, bromination process P30 was performed with the conditions shown in Table 6, and the bromination process was compared to a control bromination (P1) in which no oxidant or phase transfer catalyst was present. The IIR had 1.78 mol % unsaturation. The process P30 was undertaken as above except with the following order of process steps:

Process P30: 1) Prepare IIR cement; 2) Dissolve Lutensol™ TO5 in water; 3) Add Lutensol™ TO5 water solution to the cement; 4) Stir for 30 min to achieve 45° C.; 5) Add solid potassium peroxymonosulfate to the cement; 6) Add bromine to the cement.

In effect, the potassium peroxymonosulfate was added as a solid to the cement rather than as part of the aqueous solution thereby providing less time for the potassium peroxymonosulfate to complex with the Lutensol™ TO5 prior to starting bromination.

Figure 7:
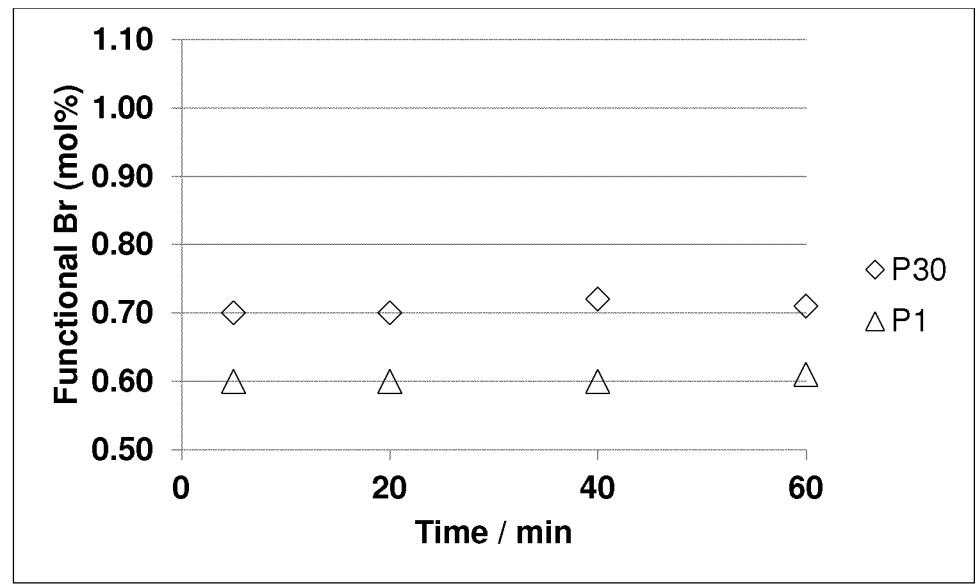
FIG. 7 is a graph of functional Br (mol %) vs. reaction time (min) for bromination of butyl rubber cement containing 20 wt % butyl rubber (IIR) and 5 wt % added water, 6.4 g potassium peroxymonosulfate oxidant and 120 mg Lutensol™ TO5 phase transfer catalyst at 45° C. (diamonds) compared to a control bromination in which no oxidant is used (triangles) showing the effect of adding the oxidant as a solid to the cement after the water and phase transfer catalyst were added but before the bromination was started.

As seen in FIG. 7, when potassium peroxymonosulfate is added to the cement as a solid (diamonds), the functional Br is 0.70 mol %, which is less efficient than when potassium peroxymonosulfate is added to the cement as part of the aqueous solution with the phase transfer catalyst (see P3 in Table 2 and FIG. 2). Therefore, pre-formation of the oxidant/PTC complex before adding them to the cement is important to maintain higher levels of bromine recovery.

TABLE 6

| IIR (20 wt %), Water (5 wt %), Temperature (45° C.), $Br_2$ (0.042 moles) | | | |
|---|---|---|---|
| Process | Oxidant (g) | PTC (mg) | PTC (type) | BAE (%) |
| P30 | 6.4 | 120 | Lutensol ™ TO5 | 37.7 |

Example 7: Effect of Temperature in the Bromination of IIR

To determine the effect of reaction temperature, bromination processes P31, P32, and P33 (P33 is the same experiment as P21) were performed as described above except for the changes in conditions shown in Table 7. The IIR had 1.78 mol % unsaturation.

Figure 8:
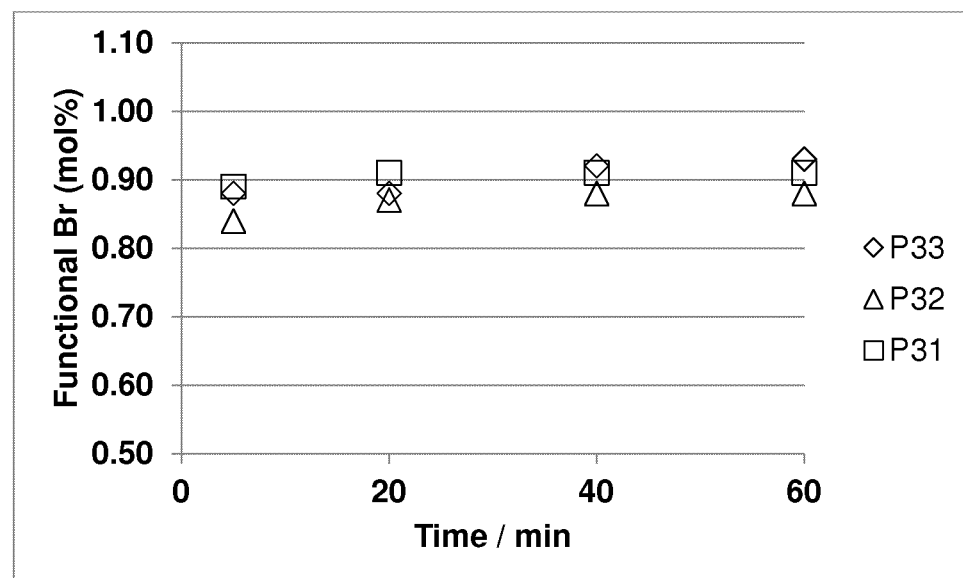
FIG. 8 is a graph of functional Br (mol %) vs. reaction time (min) for bromination of butyl rubber cement containing 20 wt % butyl rubber (IIR), 10 wt % added water, 3.2 g potassium peroxymonosulfate oxidant and 240 mg Lutensol™ TO5 phase transfer catalyst for processes performed at 23° C. (squares), 35° C. (triangles), 45° C. (diamonds).

As seen in FIG. 8, reaction temperatures of 23° C. (P31, squares), 35° C. (P32, triangles) and 45° C. (P33, diamonds) result in substantially the same bromine recovery, the functional Br is still well above controls where no oxidant is used.

TABLE 7

| IIR (20 wt %), Water (10 wt %), $Br_2$ (0.042 moles) | | | | |
|---|---|---|---|---|
| Process | T (° C.) | Oxidant (g) | PTC | BAE (%) |
| P31 | 23 | 3.2 | 240 mg Lutensol ™ TO5 | 48.3 |
| P32 | 35 | 3.2 | 240 mg Lutensol ™ TO5 | 46.7 |
| P33 (P21) | 45 | 3.2 | 240 mg Lutensol ™ TO5 | 49.3 |

Example 8: Comparison of Bromination in Hexane and Isopentane

To study the solvent effect on the bromine recovery, two brominations P34 and P35 were carried out in isopentane with water concentration at 5 wt % and 15 wt %, respectively. Table 8 provides results for samples extracted from the reaction media at the 60-minute time mark of the respective processes P34 and P35. Due to the low boiling temperature of isopentane, the two brominations were performed at 23° C. Despite the slightly lower efficiency compared to hexane (P31 and P34), both P34 and P35 showed improvement in BAE when compared to the control experiments (P1, P16 and P24) in which no oxidant was added.

TABLE 8

IIR (20 wt %), Water (10 wt %), Br$_2$ (0.042 moles)

| Process | Water (wt %) | T (° C.) | Oxidant (g) | PTC | Functional Br (mol %) | BAE (%) |
|---|---|---|---|---|---|---|
| P34 | 5 | 23 | 3.2 | 240 mg Lutensol ™ TO5 | 0.84 | 44.6 |
| P35 | 15 | 23 | 3.2 | 240 mg Lutensol ™ TO5 | 0.8 | 42.4 |

Example 9: Comparison to Peracids and Hydrogen Peroxide

To compare bromine recovery efficiency using potassium peroxymonosulfate (PPMS) to bromine recovery efficiencies of peracetic acid (PAA) and hydrogen peroxide (H$_2$O$_2$), bromination processes P36, P37, and P38 were performed as described above except for the changes in conditions shown in Table 9. The IIR had 1.78 mol % unsaturation It is evident from Table 9 that hydrogen peroxide is not nearly as efficient at bromine recovery compared to potassium peroxymonosulfate in the presence of added water, even when hydrogen peroxide is used in a molar amount that is over 4 times greater than that of potassium peroxymonosulfate. It is further evident from Table 9 that peracetic acid must be utilized in a molar amount twice that of potassium peroxymonosulfate to achieve the same bromine recovery efficiency as potassium peroxymonosulfate.

TABLE 9

IIR (20 wt %), Water (10 wt %), Temperature (45° C.), Br$_2$ (0.042 moles)

| Process | Oxidant | Oxidant (mol) | PTC | Functional Br (mol %) |
|---|---|---|---|---|
| P36 | H$_2$O$_2$ | 0.042 | none | 0.7 |
| P37 | PAA | 0.02 | none | 0.9 |
| P38 | PPMS | 0.01 | 240 mg Lutensol ™ TO5 | 0.9 |

Example 10: Other Oxidants Containing K$^+$

Figure 9:
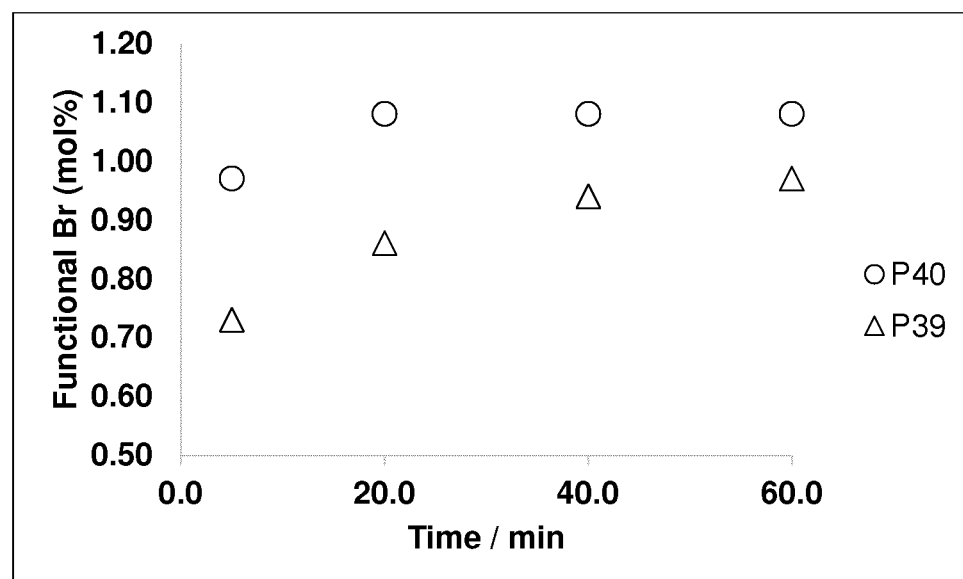
FIG. 9 is a graph of functional Br (mol %) vs. reaction time (min) for bromination of butyl rubber cement containing 20 wt % butyl rubber (IIR), 5 wt % added water at 45° C. in the presence of 1.74 g potassium bromate (triangles) and 1.74 g potassium bromate and 240 mg Lutensol™ TO5 (circles).

In addition to potassium peroxymonosulfate, potassium bromate KBrO$_3$ was studied as another K$^+$ oxidant. Bromination processes P39 and P40 were performed as described above except for the changes in conditions shown in Table 10. The IIR had 1.78 mol % unsaturation. Table 10 provides results for samples extracted from the reaction media at the 60-minute time mark of the respective processes P39 and P40. It is evident from Table 10 and FIG. 9 that addition of Lutensol™ TO5 improved the bromine recovery compared to using KBrO$_3$ alone. While KBrO$_3$ provides high bromine recovery efficiency, KBrO$_3$ is much more difficult to handle than potassium peroxymonosulfate. Therefore, potassium peroxymonosulfate is considered as the preferred K$^+$ oxidant.

TABLE 10

IIR (20 wt %), Water (5 wt %), Temperature (45° C.), Br$_2$ (0.042 moles)

| Process | Oxidant | Oxidant (mol) | PTC | Functional Br (mol %) |
|---|---|---|---|---|
| P39 | KBrO$_3$ | 0.01 | none | 0.97 |
| P40 | KBrO$_3$ | 0.01 | 240 mg Lutensol ™ TO5 | 1.08 |

Example 11: Effect of Other Metal Salts as Oxidants

To determine the effect of sodium salt-based oxidants in the presence of phase transfer catalyst on bromine recovery, bromination processes P41 and P42 were performed as described above except for the changes in conditions shown in Table 11. For P42, Lutensol™ TO5 was mixed with 6.5 mL NaClO and stirred for 5 mins prior to the addition of the NaClO solution to the reaction medium. Bromine was added to the reaction medium immediately after addition of the NaClO solution. The IIR had 1.78 mol % unsaturation.

Figure 10:
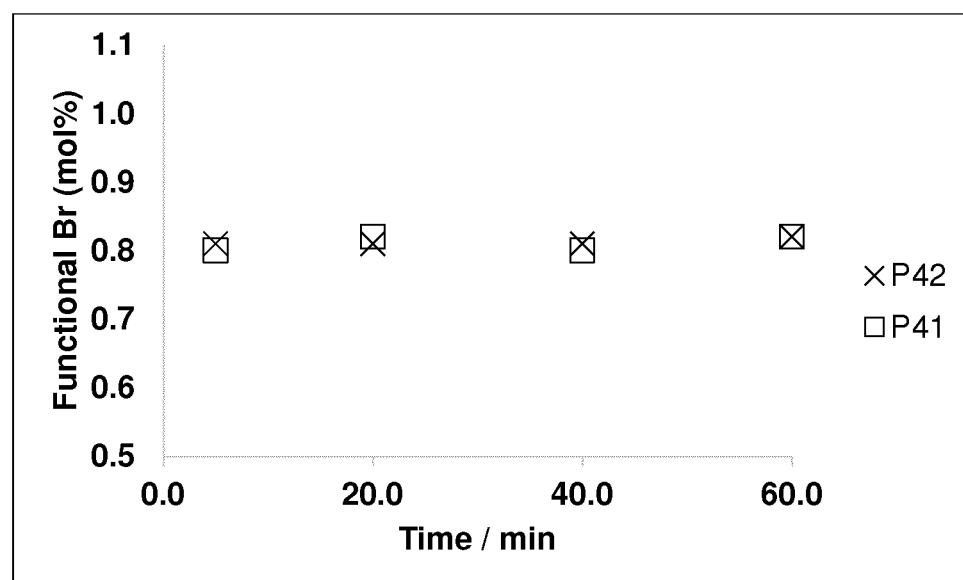
FIG. 10 is a graph of functional Br (mol %) vs. reaction time (min) for bromination of butyl rubber cement containing 20 wt % butyl rubber (IIR), 10 wt % added water at 45° C. in the presence of 6.5 mL sodium hypochlorite (squares) and 6.5 mL sodium hypochlorite and 240 mg Lutensol™ TO5 (Xs).

As seen in FIG. 10, the addition of NaClO oxidant alone (P41, squares) and NaClO oxidant with 240 mg Lutensol™ TO5 phase transfer catalyst (P42, Xs) provide very similar bromine recovery efficiencies. Therefore, the addition of Lutensol™ TO5 does not improve the bromine recovery when NaClO is used as the oxidant. Further, while NaClO provides relatively high bromine recovery efficiency, NaClO is much more difficult to handle than potassium salt-based oxidants, and is therefore not as desirable as potassium salt-based oxidants.

TABLE 11

IIR (20 wt %), Water (10 wt %), Temperature (45° C.), Br$_2$ (0.042 moles)

| Process | Oxidant | Oxidant (mol) | PTC | Functional Br (mol %) |
|---|---|---|---|---|
| P41 | NaClO | 0.01 | 0 | 0.82 |
| P42 | NaClO | 0.01 | 240 mg Lutensol ™ TO5 | 0.82 |

The novel features will become apparent to those of skill in the art upon examination of the description. It should be understood, however, that the scope of the claims should not be limited by the embodiments, but should be given the broadest interpretation 25 consistent with the wording of the claims and the specification as a whole.

What is claimed is:

1. A process for producing a halogenated isoolefin copolymer, the process comprising contacting an unsaturated isoolefin copolymer cement, the cement comprising an unsaturated isoolefin copolymer dissolved in an organic solvent, under halogenation conditions with a halogenating agent and an aqueous solution of a potassium salt-based oxidant to form a two-phase reaction medium comprising an organic phase and an aqueous phase, the potassium salt-based oxidant capable of converting hydrogen halide to free halogen.

2. The process of claim 1, wherein in the potassium salt-based oxidant comprises $KHSO_5$, $K_2S_2O_8$, KClO, $KBrO$, $KBrO_3$, $KIO_3$, $KClO_3$, $KClO_4$, $KIO_4$, compounds that generate the aforementioned potassium salt-based oxidants, or mixtures thereof.

3. The process of claim 1, wherein in the potassium salt-based oxidant comprises potassium peroxymonosulfate.

4. The process of claim 1, wherein in the potassium salt-based oxidant comprises $KHSO_5$.

5. The process of claim 1, wherein the cement has a water content of 1 wt % or greater based on total weight of the cement.

6. The process of claim 5, wherein the water content of the cement is 1.5 wt % or greater.

7. The process of claim 5, wherein the water content of the cement is 1-30 wt %.

8. The process of claim 5, wherein the water content of the cement is 2-20 wt % and the potassium salt-based oxidant comprises $KHSO_5$.

9. The process of claim 1, wherein the aqueous solution further comprises a phase transfer catalyst.

10. The process of claim 9, wherein the phase transfer catalyst comprises a molecule having at least seven oxygen atoms that are available to form a complex with a potassium ion.

11. The process of claim 9, wherein the phase transfer catalyst comprises a polyalkylene oxide ether.

12. The process of claim 9, wherein the phase transfer catalyst comprises a non-ionic surfactant having a first chain that is a hydrocarbon chain connected to a second chain comprising from 3 to 20 ethylene oxide units.

13. The process of claim 9, wherein the potassium salt-based oxidant and phase transfer catalyst are present in the aqueous solution in a molar ratio in a range of 1:3 to 100:1.

14. The process of claim 1, wherein the unsaturated isoolefin copolymer cement is produced by polymerizing at least one isoolefin monomer and at least one copolymerizable unsaturated monomer in an organic diluent and removing the organic diluent and residual monomers by flash separation with steam.

15. The process of claim 14, wherein the at least one isoolefin monomer is isobutene and the at least one copolymerizable unsaturated monomer is isoprene, p-methyl styrene or β-pinene.

16. The process of claim 14, wherein the at least one isoolefin monomer is isobutene and the at least one copolymerizable unsaturated monomer is isoprene, and the unsaturated isoolefin copolymer further comprises one or more additional copolymerizable monomers selected from the group consisting of α-methyl styrene, p-methyl styrene, chlorostyrene, cyclopentadiene, methylcyclopentadiene and indene.

17. The process of claim 14, wherein the organic diluent comprises methyl chloride.

18. The process of claim 1, wherein the halogenating agent is $Br_2$.

19. The process of claim 1, wherein the unsaturated isoolefin copolymer is present in the reaction medium in an amount of 10-33 wt %, based on total weight of the two-phase reaction medium.

20. The process of claim 1, wherein the contacting the unsaturated isoolefin copolymer cement with the halogenating agent is conducted for 1-60 minutes at a temperature in a range of 20-60° C.

* * * * *